(12) United States Patent
Hedinger et al.

(10) Patent No.: US 9,477,586 B1
(45) Date of Patent: Oct. 25, 2016

(54) POWER-AWARE MEMORY CONTROLLER CIRCUITRY

(75) Inventors: Sam Hedinger, High Wycombe (GB); Philip Clarke, Leatherhead (GB)

(73) Assignee: Altera Corporation, San Jose, CA (US)

( * ) Notice: Subject to any disclaimer, the term of this patent is extended or adjusted under 35 U.S.C. 154(b) by 121 days.

(21) Appl. No.: 13/288,890

(22) Filed: Nov. 3, 2011

(51) Int. Cl.
*G06F 12/00* (2006.01)
*G06F 13/00* (2006.01)
*G06F 9/26* (2006.01)

(52) U.S. Cl.
CPC ..................................... *G06F 12/00* (2013.01)

(58) Field of Classification Search
CPC ....................................................... G06F 12/00
USPC ........................................................... 711/154
See application file for complete search history.

(56) References Cited

U.S. PATENT DOCUMENTS

| | | | |
|---|---|---|---|
| 7,076,674 B2 | 7/2006 | Cervantes | |
| 7,721,011 B1* | 5/2010 | Sutera | 710/6 |
| 7,724,602 B2* | 5/2010 | Hur et al. | 365/226 |
| 2005/0138442 A1* | 6/2005 | Keller, Jr. | G06F 1/3203 713/300 |
| 2006/0288241 A1* | 12/2006 | Felter | G06F 1/3203 713/300 |
| 2007/0011421 A1* | 1/2007 | Keller et al. | 711/165 |
| 2008/0040563 A1* | 2/2008 | Brittain et al. | 711/154 |
| 2011/0276817 A1* | 11/2011 | Fullerton | G06F 1/3203 713/324 |
| 2012/0023347 A1* | 1/2012 | Byom et al. | 713/320 |
| 2012/0260117 A1* | 10/2012 | Acar | G06F 1/3243 713/340 |

OTHER PUBLICATIONS

Hur et al. "A Comprehensive Approach to DRAM Power Management." 2008 IEEE 14th International Symposium on High Performance Computer Architecture, 305-16, 2008.
MICRON "TN-41-01: Calculating Memory System Power for DDR3 Introduction" May 2007 [Retrieved on Mar. 23, 2011]. Retrieved from the Internet: <URL:http://www.micron.com/products/dram/ddr3_sdram.html>.
Jacob et al. "DRAM Memory System: Lecture 3." 2003 [retrieved on Mar. 23, 2011]. Retrieved from the Internet: <http://www.ece.umd.edu/courses/enee759h.S2003/lectures/Lecture3.pdf>.

* cited by examiner

*Primary Examiner* — Yong Choe
*Assistant Examiner* — Gautam Sain
(74) *Attorney, Agent, or Firm* — Treyz Law Group; Jason Tsai; Vineet Dixit

(57) ABSTRACT

Memory controller circuitry may process the memory access requests by reordering the sequence of requests. Reordering the sequence of requests may decrease the power consumption of the memory controller and system memory associated with the memory controller. The memory controller may operate in at least an unconstrained power mode, a priority mode, and a constrained power mode. In the unconstrained power mode, the memory controller may process memory access requests at elevated and power consumption levels. In the priority mode, the memory controller may process memory access requests from select sources with reduced power consumption. In the constrained power mode, the memory controller may process all memory access requests at reduced power consumption levels. Capacitive-model based power monitoring circuitry may be used to monitor the interactions between the memory controller and the system memory to dynamically adjust the operating mode of the memory controller.

3 Claims, 10 Drawing Sheets

POWER-AWARE MEMORY CONTROLLER CIRCUITRY

BACKGROUND

Integrated circuits often contain memory controllers for interfacing with memory. For example, a system with double data rate three synchronous dynamic random access memory (DDR3 SDRAM) may have a memory controller for interfacing with the DDR3 SDRAM. Memory controllers can operate at high frequencies (e.g., hundreds of megahertz) and transfer large quantities of data. As an example, a DDR3 memory controller operating at a clock speed of 533 MHz may transfer data at up to 34133 megabits per second (Mb/s). Due to the high clock speed and large quantities of data transferred, modern memory controllers consume a significant amount of power.

Conventional memory controllers are primarily optimized for bandwidth and latency. A conventional memory controller is typically configured to reduce the latency between a memory access request from a processing unit and a response to the memory access request. However, optimization for low latency memory accesses may result in unacceptable power consumption for the memory controller.

In an effort to reduce power consumption to acceptable levels, conventional memory controllers use brute force methods such as throttling memory accesses to reduce power consumption (i.e., directing the memory controller to process fewer memory access requests per second). Other conventional methods include reducing operational clock speed or turning off access to certain portions of system memory.

SUMMARY

An integrated circuit may include memory controller circuitry that serves as an interface between the integrated circuit and system memory. The integrated circuit may include a power supply unit that supplies power to the memory controller circuitry and other circuitry on the integrated circuit. The integrated circuit may include power monitoring circuitry that monitors in real time the power consumed by the integrated circuit. The memory controller circuitry may include multi-port logic, controller circuitry, power monitoring circuitry, and memory interface circuitry. The memory controller circuitry may receive memory access requests from circuitry on the integrated circuit. The memory controller circuitry may be used to reorder the sequence of the memory access requests. The memory controller circuitry may access the system memory based on the reordered sequence of memory access requests. This reordering of memory access requests may decrease the power consumption of the memory controller and the system memory.

The memory controller may be operable in various modes. For example, the memory controller may at least operate in an unconstrained power mode, a priority mode, and a constrained power mode. When operating in the unconstrained power mode, the memory controller may process memory access requests while consuming as much power as necessary to provide reduced latency. When operating in the priority mode, the memory controller may process a subset of its memory access requests with reduced power consumption (e.g., the memory controller may reorder the subset of memory access requests). When operating in the constrained power mode, the memory controller may process all memory access requests while limiting the power consumption below a predetermined threshold.

The memory controller may use a counter to determine the mode of operation. The counter tracks in real time the power consumption of the memory controller and system memory. The value of the counter may increase when the current supplied to the counter and the system memory is greater than the current drawn by the memory controller and the system memory, whereas the value of the counter may decrease when the current supplied to the memory counter and the system memory is less than the current drawn from by the memory controller and the system memory. The value of the counter may be used to determine the mode of operation.

Further features of the present invention, its nature and various advantages will be more apparent from the accompanying drawings and the following detailed description.

DETAILED DESCRIPTION

Embodiments of the present invention relate to integrated circuits with memory controllers. An integrated circuit may include a memory controller that interfaces between system memory and other circuitry formed on the integrated circuit. Due to high data transfer speeds, memory controllers may consume unacceptable amounts of power.

Figure 1:
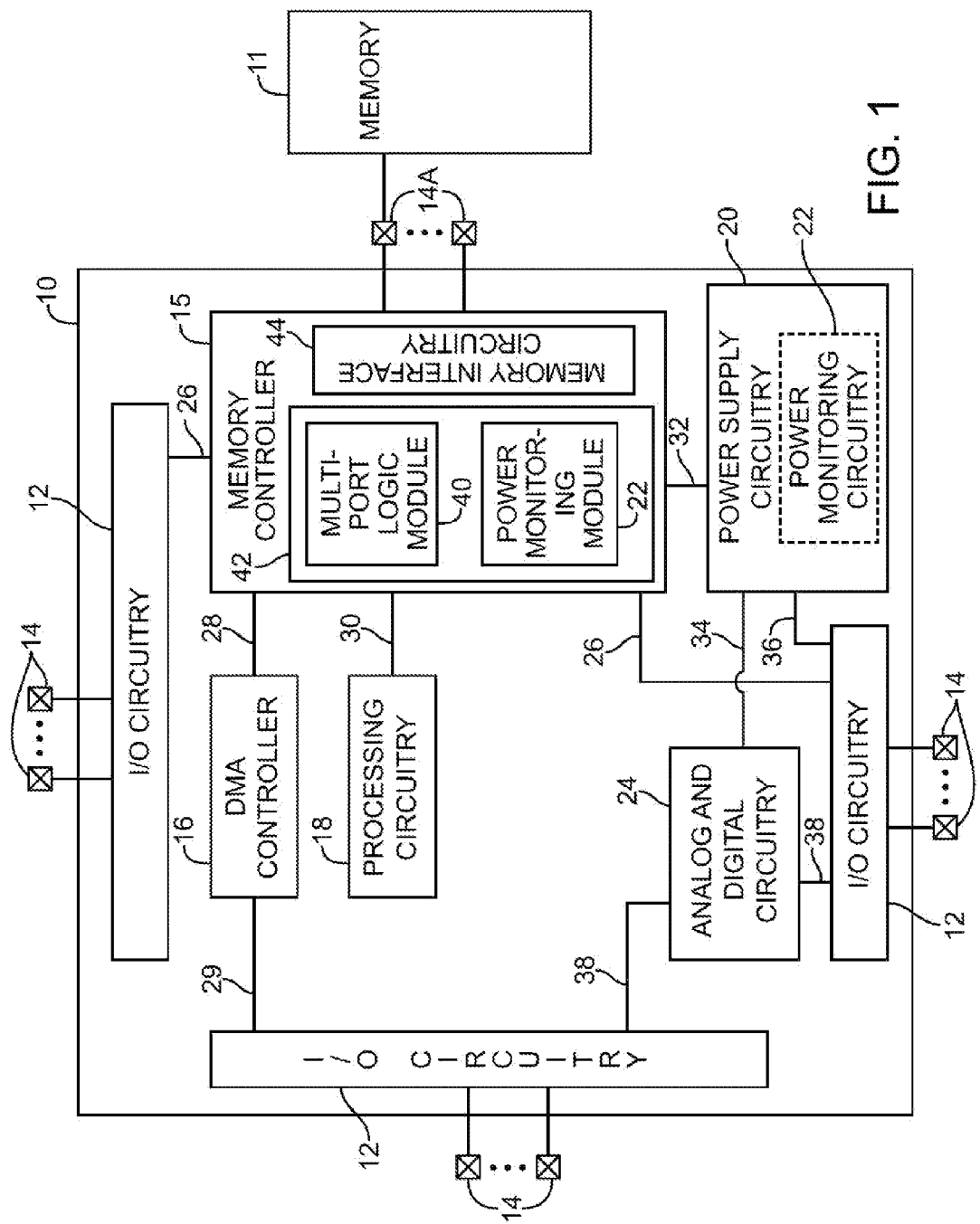
FIG. 1 is a schematic diagram of an illustrative integrated circuit with memory controller circuitry in accordance with an embodiment of the present invention

An illustrative integrated circuit 10 with a memory controller 15 is shown in FIG. 1. Integrated circuit 10 may be coupled to system memory 11 through pins 14A. Memory controller 15 may be coupled between on-chip circuitry such as input-output (I/O) circuitry 12, direct memory access (DMA) controller 16, and processing circuitry (e.g., a central processing unit) and off-chip system memory. As an example, memory controller 15 may receive memory access requests from processing circuitry 18 and may read data from the system memory or write data into the system memory.

As shown in FIG. 1, integrated circuit 10 may include input-output (I/O) circuitry such as I/O circuitry 12 formed along each edge of device 10. Circuitry 12 may be used for driving signals off of device 10 and for receiving signals from other devices via I/O pins 14. For example, I/O circuitry 12 may receive memory access requests from a digital card reader via I/O pins 14. The memory access requests received through I/O circuitry 12 may be conveyed to direct memory access (DMA) controller 16 via path 29. DMA controller 16 may convey memory access requests from I/O circuitry 12 to memory controller 15 via path 28. As another example, device 10 may receive system memory power consumption information through I/O circuitry 12.

I/O circuitry 12 may also be coupled to memory controller 15 through paths 26. I/O circuitry 12 coupled to memory controller 15 may be used to convey high speed memory access requests directly to memory controller 15. For example, device 10 that is used for a gigabit Ethernet application may transfer large quantities of data from system memory to other electronic devices at high speeds (e.g., hundreds of megabits per second). The high speed memory accesses required by applications such as gigabit Ethernet may be unsuitable for processing by DMA controller 16 and processing circuitry 18 (e.g., using processing circuitry 18 to handle gigabit Ethernet memory may prevent processing circuitry 18 from performing other tasks).

Memory controller 15 may include controller circuitry 42 that receives and processes memory access requests from sources such as DMA controller 16 and processing circuitry 18. Controller circuitry 42 may include modules such as multi-port logic module 40 and power monitoring module 22. Memory controller 15 may also include memory interface circuitry 44. Multi-port logic module 40 may receive memory access requests from as processing circuitry 18, DMA controller 15, and I/O circuitry 12, and other circuits that require access to system memory 11. Memory access requests received by memory controller 15 may include read requests, write requests, or other memory access requests. Memory controller 15 may use controller circuitry 42 and memory interface circuitry 44 to configure system memory 11 to respond to the memory access requests received by memory controller 15 (i.e., memory controller 15 may access system memory 11 to fulfill the memory access requests received by memory controller 15). For example, in response to receiving a read request from processing circuitry 18, memory controller 15 may use controller circuitry 42 to generate control signals that configure system memory 11 to reply with the appropriate data. As another example, in response to receiving a write request from DMA controller 16, memory controller 15 may use controller circuitry 42 to generate control signals that configure the system memory 11 to load desired data. Memory controller 15 may receive memory access requests to write and read data to and from desired locations within system memory 11. For example, memory controller 15 may receive a request from processing circuitry 18 to read a word of data from a desired address of system memory 11. In response to receiving the read request, memory controller 15 may process the request with multi-port logic module 40, generate control signals using controller circuitry 42, and convey the control signals to system memory 11 via memory interface circuitry 44 and I/O pins 14A. The control signals (e.g., system clock, memory address, and command signals) generated by memory controller 15 may configure system memory 11 to reply with data stored at the desired address.

In the example of FIG. 1, power supply circuitry 20 may provide power supply signals to circuitry such as memory controller 15, processing circuitry 18, DMA controller 16, and analog and digital circuitry 24.

Controller circuitry 42 may include power monitoring module 22 that monitors power metrics. Power monitoring module 22 located in memory controller 15 may measure the power consumption associated with the operation of memory controller 15. This, however, is merely illustrative. Power monitoring module 22 may be located in any location suitable for monitoring or modeling the power consumption associated with the operation of memory controller 15. For example, power monitoring module 22 may be located in power supply circuitry 20 or may be located in a different device outside of device 10 that communicates with device 10 via I/O circuitry 12 and pins 14.

System memory 11 may be organized in physical pages. Sequential system memory accesses within a single page may not result in excessive power consumption. However, sequential accesses to different pages may undesirably increase the power consumed by system memory 11. Due to the architecture of system memory 11, each memory access in a sequence of memory accesses may therefore consume different amounts of power.

As an example, an initial access to a first physical page may require the first page to be electrically activated (sometimes referred to as opening a page). Accessing a second physical page after selecting the first page may require the first page to be electrically deactivated (e.g., closing the first page) before opening the second page. The amount of power consumed by sequentially accessing two different physical pages in system memory 11 may be at least equal to the sum of the power consumed when opening the first page, the power consumed when closing the first page, and the power consumed when opening the second page.

Figure 2:
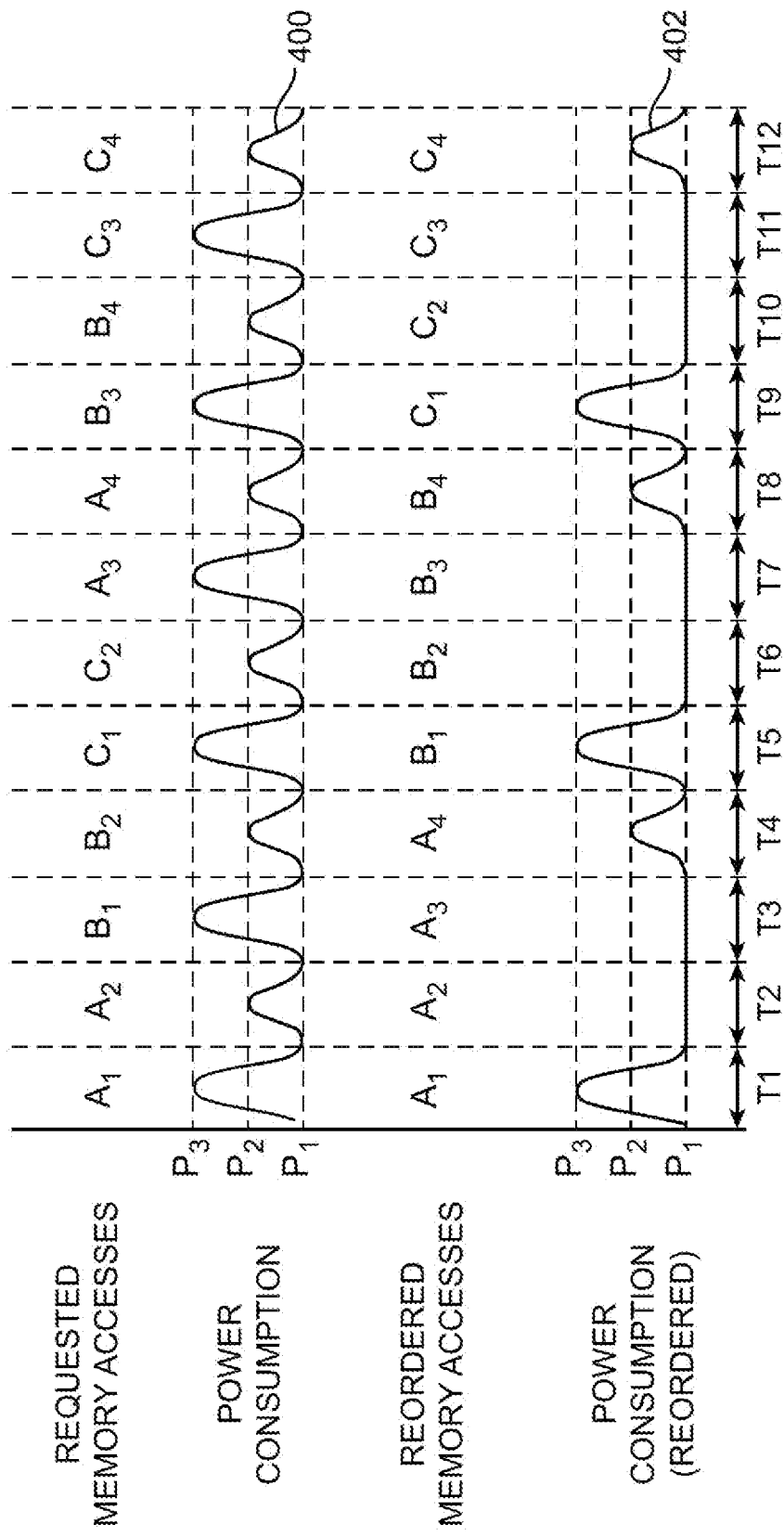
FIG. 2 is a timing diagram illustrating a decrease in power consumption as a result of reordering memory access requests in accordance with an embodiment of the present invention.

In the example of FIG. 2, memory controller 15 may receive memory access requests from processing circuitry 18 and DMA controller 16. Memory controller 15 may sequentially receive memory access requests A1, A2, B1, B2, C1, C2, A3, A4, B3, B4, C3, and C4. Memory accesses A1, A2, A3, and A4 may be accesses to a first page. Memory accesses B1, B2, B3, and B4 may be accesses to a second page. Memory accesses C1, C2, C3, and C4 may be accesses to a third page.

During time period T1, processing circuitry 18 may request to read data at address A1. During time T2, DMA controller 16 may request to read data at address A2. During time T3, DMA controller 16 may request to read data at address B1, etc. (as an example). The power consumed by the system memory in response to memory access requests in this order may produce an associated power consumption curve 400. During time period T1, memory controller 15 opens the first page to read the system memory at address A1. Opening the first page may consume excess power P3-P1 during T1. During time period T2, memory controller 15 closes the first page in preparation for opening the second page and system memory 11 may consume excess power P2-P1 associated with closing the first page. During time period T3, memory controller 15 opens the second page to read the system memory at address B1. During time period T4, memory controller 15 closes the second page before opening the third page (to read address C1 from system memory). Because the sequence of requested memory accesses in the example of FIG. 2 sequentially opens different physical pages (e.g., a first page during T1, a second page during T3, a third page during T5, etc.), the system memory consumes power P3 and P2 every two accesses.

To reduce the power consumed by the system memory, memory controller 15 may reorder the memory accesses before configuring the system memory to respond to the memory accesses. Reordering memory accesses in this way may reduce the power consumption of memory controller 15 by 30 percent (as an example). In the example of FIG. 2, memory controller 15 may reorder the requested memory accesses by grouping together memory access to the same page (e.g., memory accesses to A3 and A4 may be performed following memory accesses to A1 and A2, and memory accesses to B3 and B4 may be performed following memory accesses to B1 and B2). Reordering the memory access sequence may decrease the power consumed by the system memory.

In the example of FIG. 2, the consumption profile 402 of system memory using the reordered memory access sequence is shown. Because the memory accesses have been reordered to group together memory accesses to the same physical page, the number of times that pages are opened and closed is decreased. For example, the reordered memory access sequence opens pages three times (at times T1, T5, and T9) and close pages three times (at times T4, T8, and T12), while the original requested memory access sequence opens pages six times (at times T1, T3, T5, T7, T9, and T11) and closes pages six times (at times T2, T4, T6, T8, T10, and T12). The decrease in the frequency of physical activation and deactivation of pages may result in reduced average power consumption for the memory controller and system memory.

The reordering of memory accesses may decrease power consumption of the system memory while maintaining throughput (i.e., the power consumed by the system memory may decrease while the number of memory accesses per time period may remain constant). In the example of FIG. 2, the reordered memory access sequence accesses the same 12 memory addresses as the original memory access sequence (A1-A4, B1-B4, and C1-C4) in the same given time period (T1-T12).

It may be desirable to operate circuitry on device 10 in varying power saving modes. Operation of circuitry using various power saving modes may be herein described in association with memory controller 15. However, it should be understood that any circuitry on device 10 (e.g., A/D circuitry 24, DMA controller 16, or I/O circuitry 12) that consumes power may be operated using the various power saving modes described herein.

The operation of memory controller 15 may be dynamically adjusted in response to the power consumption of memory controller 15 and system memory 11 (e.g., the operation of memory interface circuitry 44 may be dynamically adjusted to correspond to various power saving modes).

In scenarios in which high performance is desired, memory controller 15 may operate in an unconstrained mode. In scenarios in which low power consumption is desired, memory controller 15 may operate in a power constrained mode. For example, an external battery may provide power to device 10 via pins 14 and I/O circuitry 12. It may be desirable to prevent device 10 from drawing large amounts of instantaneous current (e.g., to increase the battery life). Device 10 may be operated in additional partially constrained modes other than the unconstrained mode and the constrained mode. As an example, a priority mode may be added to allow unconstrained memory accesses from processing circuitry 18 while limiting memory accesses from DMA controller 16 and I/O circuitry 12. The priority mode may allow device 10 to process tasks such as processor instruction fetching at optimal speeds while reducing overall power consumption.

Memory controller 15 may operate in a selected mode (e.g., an unconstrained mode, priority mode, constrained mode, etc.) based on the current power consumption of the memory circuitry (i.e., memory controller 15 and the system memory). Power monitoring module 22 may be used to monitor power metrics associated with the power consumption of memory controller 15.

Figure 3:
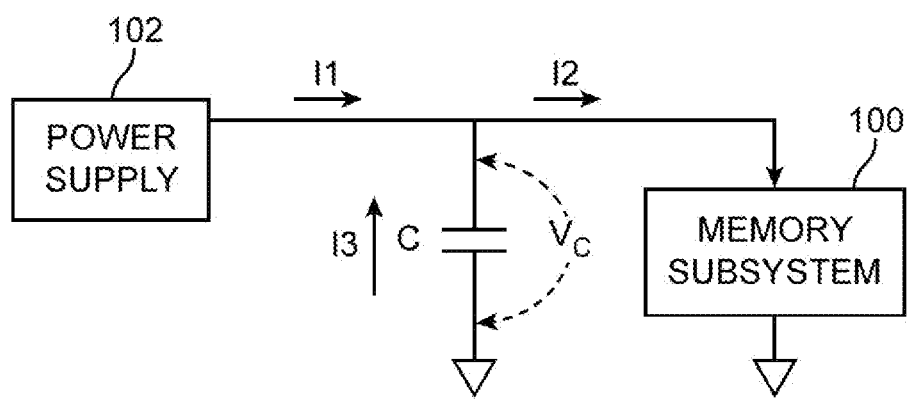
FIG. 3 is an exemplary diagram showing current drawn from a power supply unit in accordance with an embodiment of the present invention.

For example, a power metric associated with the power consumed by the memory circuitry may be estimated by modeling and monitoring the interaction between memory controller 15 and circuitry coupled to memory controller 15 (e.g., processing circuitry 18, DMA controller 16, and I/O circuitry 12). As shown in FIG. 3, a capacitive model can be used to estimate the power consumption of memory subsystem 100 (e.g., to monitor the combined power consumption of the system memory and memory controller 15).

In the example of FIG. 3, capacitor C represents the capacitance (Cc) associated with memory subsystem 100. The capacitance of representative capacitor C may be equal to the parallel sum of the capacitance of decoupling capacitors associated with memory subsystem 100 and other parasitic capacitances associated with memory subsystem 100. The power consumed by memory subsystem 100 may be modeled with voltage Vc across representative capacitor C.

Voltage Vc across representative capacitor C represents the amount of charge Q stored on capacitor C (e.g. Q=Vc*Cc). The change in charge Q stored on capacitor C may correspond with the power consumed by memory subsystem 100. For example, memory subsystem 100 may draw current I2. Depending on the magnitude of I2 current I3 may be drawn from capacitor C (e.g., current I3 may supply a portion of current I2). Supplying instantaneous current I3 from capacitor C may cause a corresponding change in voltage across capacitor C.

Power supply 102 may supply a constant current I1 to capacitor C and memory subsystem 100. Current I1 supplied by power supply 102 may be limited by the maximum instantaneous current that power supply 102 is capable of providing (e.g., for a given supply voltage, power supply 102 may provide only a limited amount of instantaneous current to memory subsystem). When memory subsystem 100 is drawing less current than the maximum instantaneous current from power supply 102, at least some of power supply current I1 may charge representative capacitor C towards the power supply voltage (e.g., current I1 may charge decoupling capacitors, input capacitors, and other capacitors associated with memory subsystem 100 to a voltage level equal to the voltage supplied to power supply 102).

In some scenarios, representative capacitor C may provide instantaneous current to memory subsystem 100. For example, when the instantaneous current I2 drawn by memory subsystem 100 exceeds the maximum instantaneous current of power supply 102 (i.e., when I2>I1), then capacitor C may supply instantaneous current I3 to memory subsystem 100 to compensate for the current deficit (e.g., current I3 may be equal to current I1 minus current I2).

The voltage Vc across capacitor C may have a value corresponding to the varying current drawn from power supply 102 by memory subsystem 100 (i.e., changes in power consumption of memory subsystem 100 result in corresponding changes in voltage Vc). The mode of operation for memory controller 15 may be chosen based on the value of voltage Vc.

Figure 4:
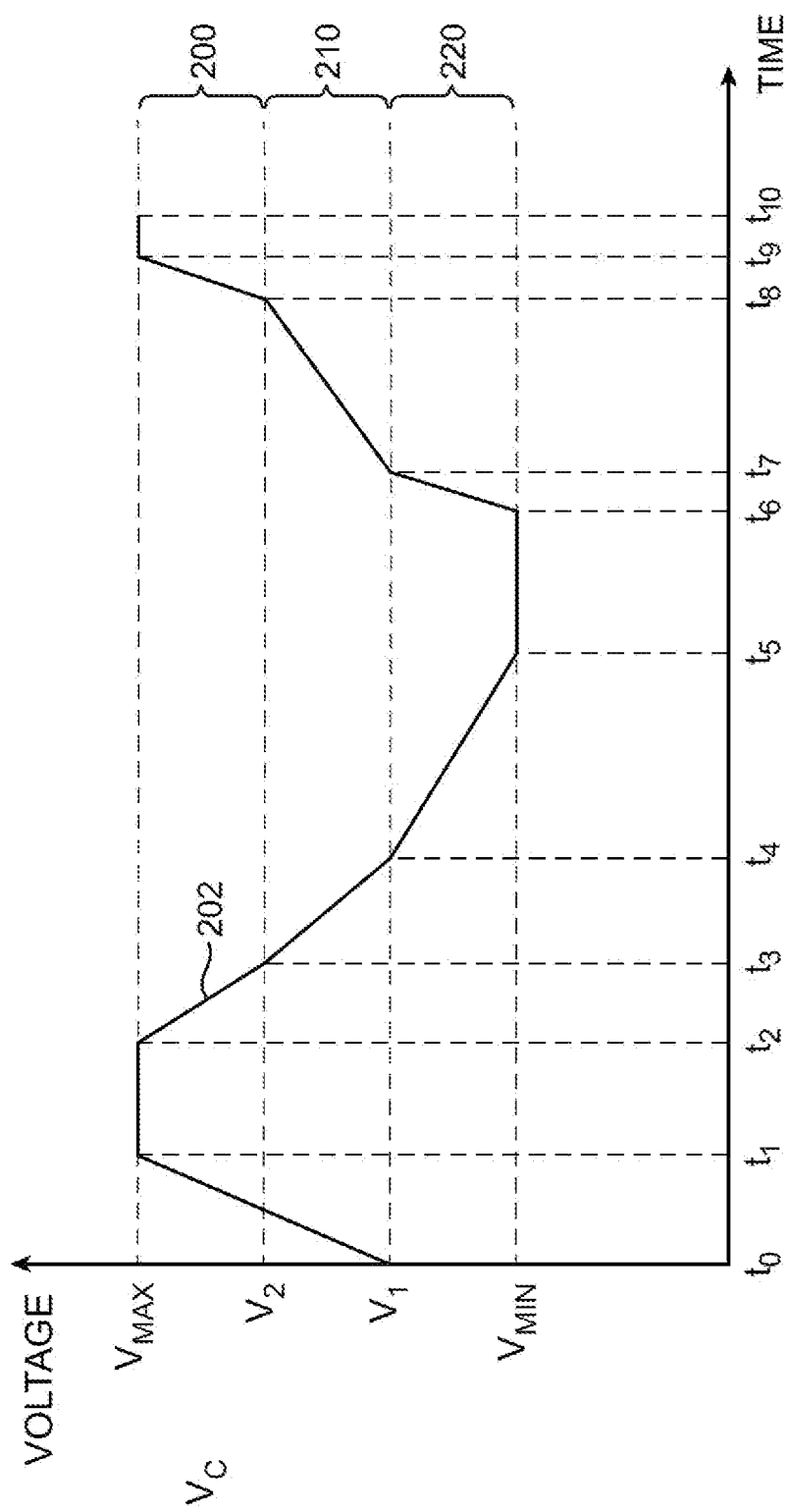
FIG. 4 is an exemplary diagram showing a memory controller operating in different modes in accordance with an embodiment of the present invention.

Memory controller 15 may, for example, operate in three different operation modes (see, e.g., FIG. 4, a constrained mode 220, an unconstrained mode 200, and a priority mode 210). In the example of FIG. 4, the slope of curve 202 may be proportional to the current supplied by power supply 102 minus the current drawn by memory subsystem 100 (e.g., the change in Vc across capacitor C may be proportional to current I1 minus current I2).

At time t0, device 10 may have just been powered on. Power supply 102 may begin charging representative capacitor C with current I1 (i.e., current I1 may be substantially equal to current I3).

At time t1, the capacitors associated with memory subsystem 100 may be charged to voltage ceiling Vmax. Voltage Vmax may be equal to a positive power supply voltage. At time t1, memory subsystem 100 may be placed in normal operation and the current drawn by memory subsystem 100 may be equal to the current supplied by power supply 102 (i.e., current I3 may be zero and Vc may remain constant at the positive power supply voltage). Memory subsystem 100 may be operating in an unconstrained mode (e.g., memory access requests from circuitry such as processing circuitry 18, DMA controller 16, and I/O circuitry 12 may be processed and optimized for latency and/or performance).

At time t2, the power consumed by memory subsystem 100 may exceed the available power from power supply 102 (e.g., I2>I1). When I2 is greater than I1, representative capacitor C may supply current I3 to memory subsystem 100 (e.g., I3+I1=I2). Current I3 supplied by capacitor C may reduce voltage Vc across the capacitor at a rate equal to the magnitude of current I3.

At time t3, voltage Vc across capacitor C may fall below a first threshold voltage level V2. In response to voltage Vc decreasing below threshold V2, memory controller 15 may be configured to operate in the priority mode. In the priority mode, memory accesses requested from selected (priority) sources (e.g., processing circuitry 18) may be processed at high performance levels while memory accesses from non-priority sources (e.g., I/O circuitry 12 and DMA controller 16) may be reordered and/or throttled to reduce the power consumption of memory subsystem 100. For example, the rate of memory access requests from I/O circuitry 12 may be throttled by queuing memory access requests from I/O circuitry 12 and the memory access requests from I/O circuitry 12 may be simultaneously reordered. The current I3 supplied by capacitor C may decrease as the power consumed by memory subsystem 100 decreases (i.e., the slope of curve 202 from time t3 to t4 may be less steep than the slope of curve 202 from time t2 to t3).

At time t4, voltage Vc across capacitor C may fall below a second threshold voltage level V1. When voltage Vc falls below threshold V1, memory controller 15 may be configured to operate in the constrained power mode. In the constrained power mode, memory access requests from all circuitry (e.g., processing circuitry 18, DMA controller 16, and I/O circuitry 12) may be reordered and/or throttled to reduce the power consumed by memory subsystem 100.

At time t5, voltage Vc across capacitor C may be equal to a voltage floor Vmin. To increase the life of a battery supplying power to memory circuitry on device 10, Vmin may be set to a reduced power supply voltage level that limits the maximum current draw of memory subsystem 100. While voltage Vc is at Vmin, the rate at which all memory access requests are processed by memory controller 15 may be reduced until the power consumed by memory subsystem 100 is equal to the power available from power supply 102 (e.g., until current I2 is equal to current I1 and current I3 is zero). When current I3 is zero, capacitor C need not provide any current to memory subsystem 100 (i.e., Vc will not fall below Vmin).

The use of voltage threshold Vmin to constrain the maximum current draw of memory subsystem 100 may allow device 10 to use a power supply 102 with a reduced maximum current supply. A power supply 102 that supplies a decreased current I1 may cause an increased voltage swing across capacitor C (i.e., representative capacitor C may be depleted of charge at a higher rate because the power supply current I1 may be less than the instantaneous current draw of memory subsystem 100). The use of voltage floor Vmin may prevent the increase in voltage swing across capacitor C due to the decrease in available current from power supply 102. For example, if voltage Vc across capacitor C falls to Vmin, the power consumption of memory subsystem 100 may be reduced by power reduction techniques used by memory controller 15 in the constrained operation mode (e.g., the current drawn by memory controller 15 may be reduced so that voltage Vc is at least equal to Vmin).

At time t6, the power consumed by memory subsystem 100 may be less than the power available from power supply 102. For example, DMA controller 16 may complete a burst data transfer and stop requesting memory accesses. At this time, the difference between the current supplied by power supply 102 and the current consumed by memory subsystem 100 may charge capacitor C.

At time t7, voltage Vc across capacitor C may exceed V1. When Vc exceeds threshold V1, memory controller 15 may be configured to operate in the priority mode (e.g., memory access requests from priority circuitry such as processing circuitry 18 may be processed at elevated speeds while memory access requests from non-priority circuitry may be processed using limited power). At this time, the current supplied by power supply 102 may be greater than the current drawn by memory subsystem 100 (i.e., I1 may be greater than I2, and Vc is increasing).

At time t8, Vc may exceed threshold V2. At threshold voltage V2, memory controller 15 may be configured to operate in the unconstrained mode. However, the rate of memory access requests from sources such as processing circuitry 18 and DMA controller 16 may be low (e.g., processing circuitry 18 may not require any memory accesses). Current I1 supplied by power supply 102 may be greater than current I2 drawn by memory subsystems 100 (e.g., memory subsystems 100 may not have any memory requests to respond to). In this scenario, capacitor C may be charged by the maximum available current available from power supply 102.

Voltage levels Vmax, V2, V1, and Vmin may be adjusted dynamically during the operation of device 10. For example, consider a scenario in which an external battery is used to provide power to device 10. Prolonged use of the battery may reduce the voltage supplied by the battery to device 10. In this scenario, threshold Vmax may be decreased to match the reduced positive power supply voltage supplied by the battery. Voltage threshold Vmin may be increased to reduce the maximum power consumed by device 10 (i.e., the maximum average current drawn by memory subsystem 100 may be constrained) to increase battery life. Voltage thresholds V1 and V2 may be selected to correspond with a target amount of power savings for memory subsystem 100. For example, to increase the amount of power savings, thresholds V1 and V2 may be increased. An increase in thresholds V1 and V2 may increase the amount of time that memory subsystem 100 spends in priority mode/constrained mode, which may result in increased power savings.

Power metrics such as the voltage Vc across representative capacitor C may be monitored or modeled using power consumption information from power monitoring circuitry 22 and power consumption information received by I/O circuitry 12 through I/O pins 14. For example, the amount of current drawn by system memory may be received by I/O circuitry 12. The amount of current drawn by memory controller 15 may be monitored by power monitoring module 22. The amount of current drawn by system memory and the amount of current drawn by memory controller 15 may be used to calculate current I2 and voltage Vc.

The different modes of operation for memory controller 15 may also be determined using a counter circuit that keeps track of Vc (i.e., the value of the power counter may represent the charge stored in capacitor C). The power counter circuit may be formed as an integral part of power monitoring module 22 (see, e.g., FIG. 1). The current supplied by power supply 102 may be represented by a value added to the power counter for every time period T. The power consumed by memory subsystem may be represented by a value subtracted from the power counter for every time period T.

The power consumed by memory subsystem 100 may be modeled as the sum of the power consumed by each individual memory access request processed by memory controller 15. The memory access requests may be categorized based on the respective power consumed by each type of memory access.

For example, a first memory access request may read a first address from a first page. A second memory access request immediately after the first memory access request may read a second address from a second page. The first memory access may consume power equal to the power consumed by opening the first page and reading data from the first address. The second memory access request may consume power equal to the power consumed by closing the first page, opening the second page, and reading the second address. A third memory access request immediately after the second memory access request may read a third address from the second page. The third memory access request may consume power equal to the power consumed by reading data from the third address (i.e., there is no power consumed due to opening or closing a page since the second page is already open). The first memory access request may be placed in a first category (e.g., a category for read accesses that include opening a page), the second memory access request may be placed in a second category (e.g., a category for read accesses that include closing a first page and opening a second page), and the third memory access request may be placed in a third category (e.g., a category for read accesses that do not require opening or closing a page). The first, second, and third categories (types) of memory accesses are merely illustrative and are not intended to limit the scope of the present invention.

The number of memory access requests for each of the categories may be scaled by corresponding weights to obtain the power consumption of each category. For example, the power consumed by the category for read accesses that include opening a page may be calculated by multiplying the number of memory access requests in the category by the power consumed by opening a single page and reading a single address.

The total power consumed by memory subsystem 100 for a time period T may be calculated by summing the power consumption of each category for time period T. This value may be subtracted from the power counter to represent the power consumed by memory subsystem 100 for time period T.

Figure 5:
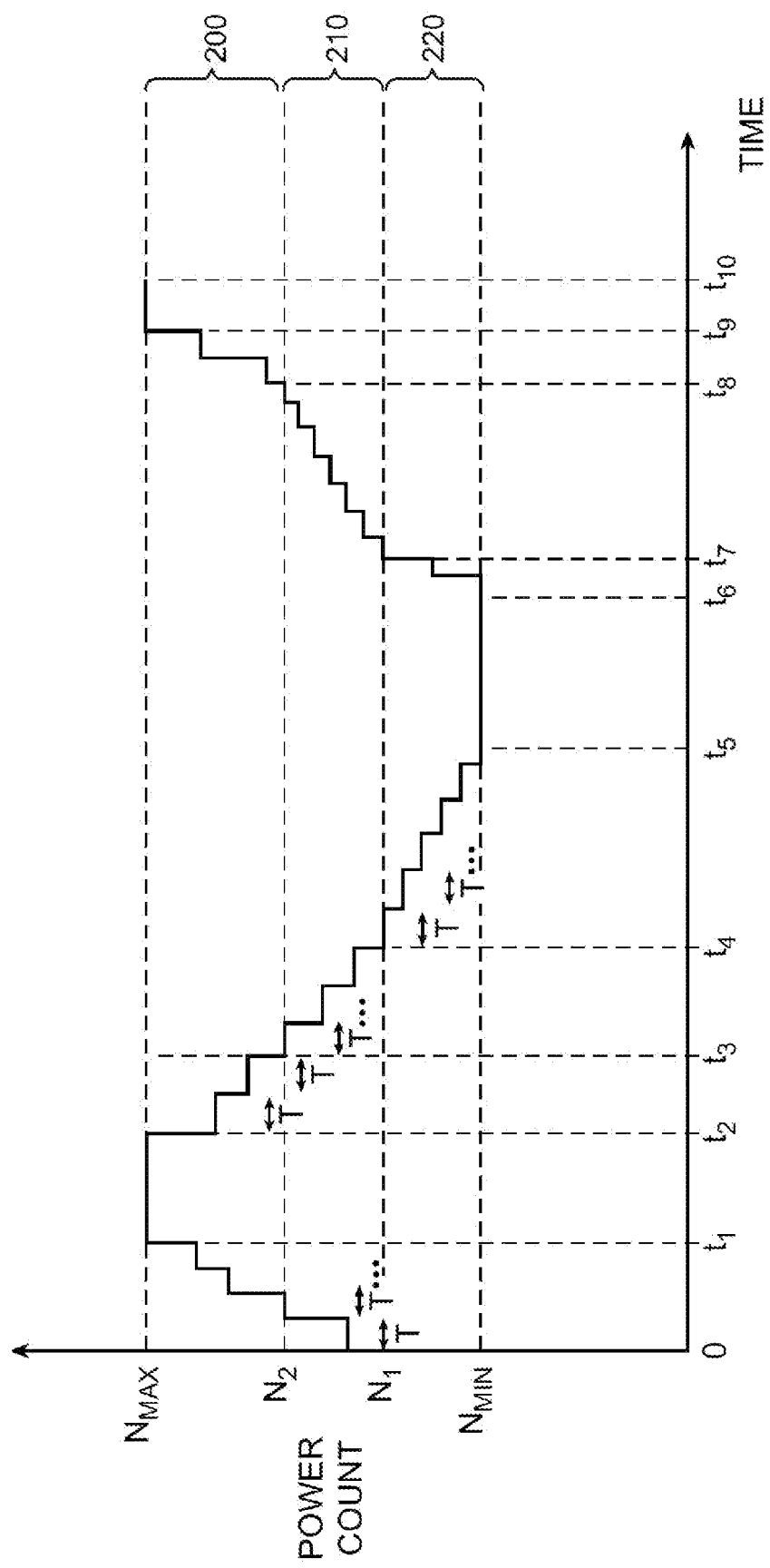
FIGS. 5 and 7 are timing diagrams illustrating how a counter may be used to monitor power consumption in accordance with an embodiment of the present invention.

FIG. 5 illustrates the behavior of a system using a power counter to model the power consumption of memory subsystem 100 in accordance with one embodiment. In the example of FIG. 5, the power counter is updated every time period T. At the end of every time period T, the power consumed by memory subsystem 100 may be calculated and subtracted from the power counter. Also, at the end of every time period T, the power supplied by power supply 102 may be added to the power counter.

During time periods T where the power consumed by memory subsystem 100 is less than the power supplied by power supply 102, the value of the power counter may increase (e.g., during time periods T between time 0 and time t1 or between time t6 and time t9). During time periods T where the power consumed by memory subsystem 100 is more than the power supplied by power supply 102, the value of the power counter may decrease (e.g., during time periods T between time t2 and t5).

During time periods T when the value of the power counter is between a first counter threshold N1 and a minimum counter threshold Nmin, memory controller 15 may operate in a constrained power mode (e.g., memory controller 15 may throttle and/or reorder memory access requests to decrease power consumed by memory subsystem 100). Count Nmin may correspond to a Vc value of Vmin.

During time periods T where the value of the power counter is between the first counter threshold N1 and a second counter threshold N2 (e.g., a second counter threshold N2 that is greater than the first counter threshold N1), memory controller 15 may operate in a priority power mode. In the priority power mode, memory controller 15 may selectively throttle memory access requests that are not prioritized (e.g., memory controller 15 may throttle processing of non-priority memory access requests while processing priority memory access requests at maximum speed).

During time periods T where the value of the power counter is between second counter threshold N2 and a count Nmax, memory controller 15 may operate in an unconstrained mode (e.g., memory controller 15 may process all memory access requests at maximum speed).

Figure 6:
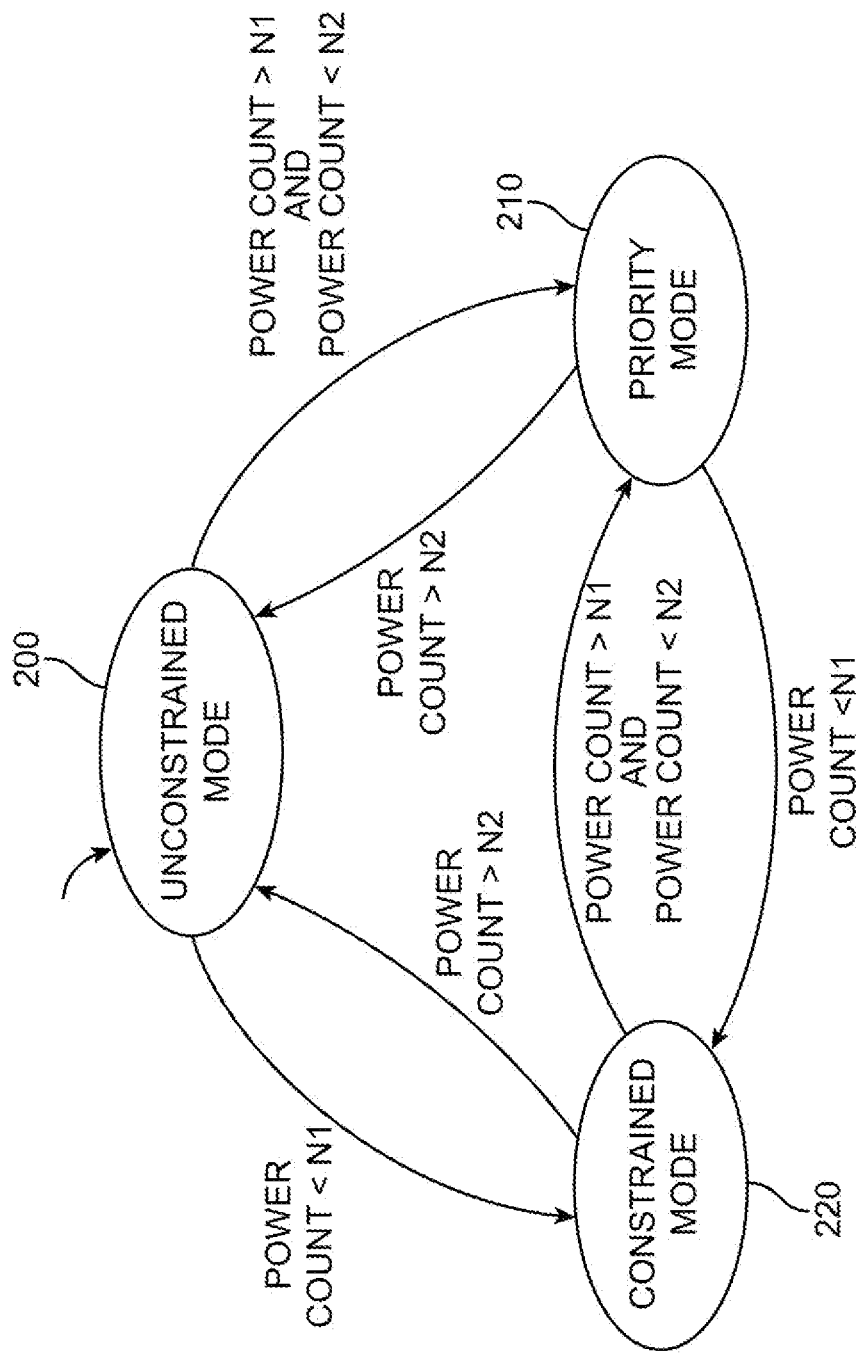
FIG. 6 is an exemplary diagram illustrating three memory controller operating modes in accordance with an embodiment of the present invention.

The state diagram of FIG. 6 illustrates three different operating modes for memory controller 15 that is monitored using a power counter. Upon startup (e.g., when the capacitance associated with memory controller 15 has been charged to a positive power supply voltage), memory controller 15 may be configured to operate in the unconstrained mode 200.

During unconstrained mode 200, if the value of the power counter (power count) decreases below a counter threshold N2 and remains greater than a counter threshold N1, memory controller 15 may be configured in priority mode 210. If the power count decreases below counter threshold N1, memory controller 15 may be configured in a constrained mode 220.

During priority mode 210, if the power count decreases below counter threshold N1, memory controller 15 may be configured in constrained mode 220. If the power count increases above counter threshold N2, memory controller 15 may be configured in unconstrained mode 200.

During constrained mode 220, if the power count increases above counter threshold N1 and remains less than counter threshold N2, memory controller 15 may be configured in priority mode 210. If the power count increases above counter threshold N2, memory controller 15 may be configured in unconstrained mode 200.

If desired, memory controller 15 may operate in any desired number of modes. Memory controller 15 may include modes of operation for different levels of prioritization (e.g., a first priority mode of operation may prioritize requests from processing circuitry 18, whereas a second priority mode may prioritize requests from processing circuitry 18 and DMA controller 16).

Figure 7:
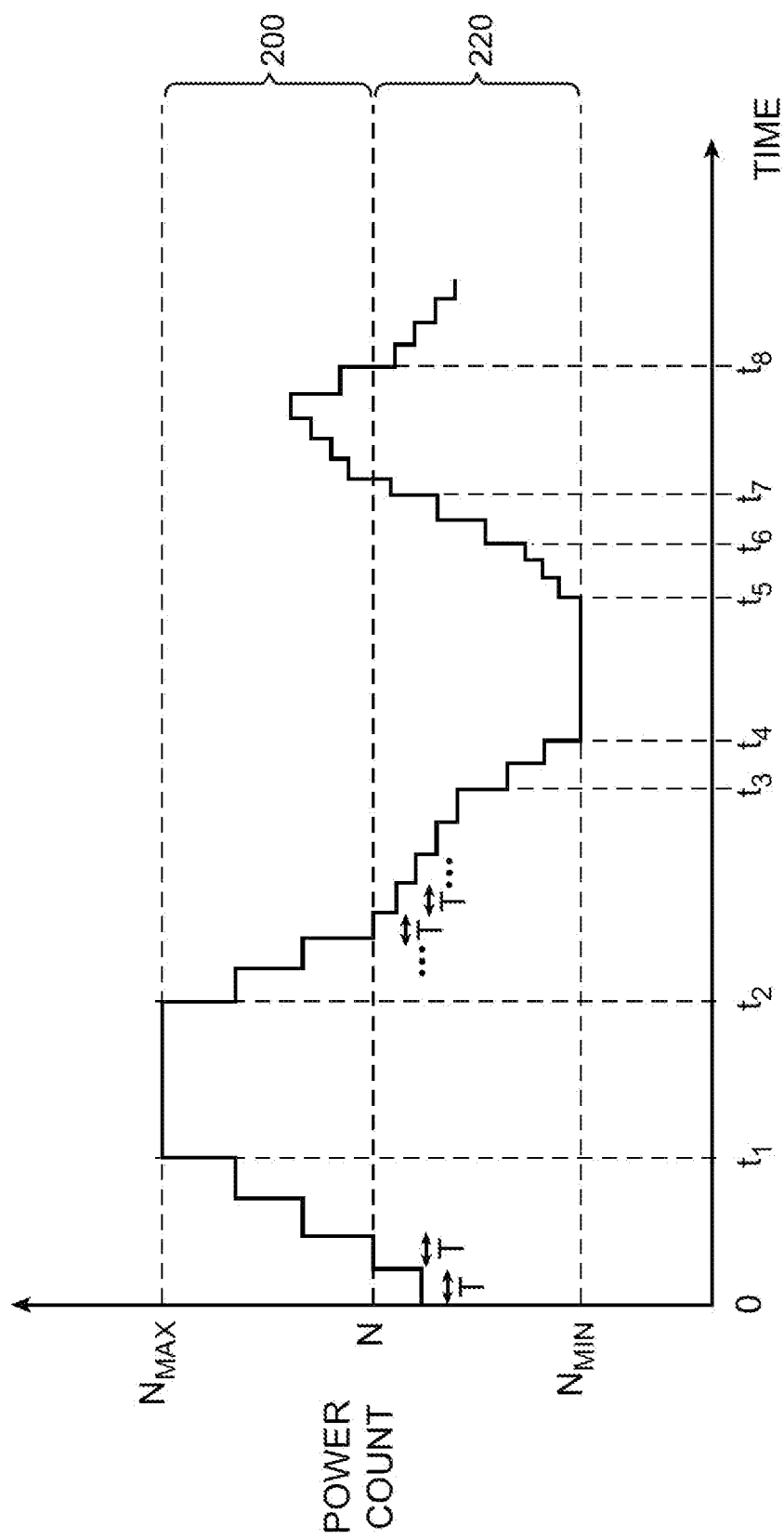

The example of FIG. 7 illustrates a memory controller 15 operable in two power modes. During time periods T in which the power count is less than a counter threshold N and greater than a minimum count Nmin, memory controller 15 may operate in a constrained power mode 220 (e.g., memory controller 15 may reorder and/or throttle memory access requests). During time periods T in which the power count is greater than the counter threshold N and less than the maximum count Nmax, memory controller 15 may operate in an unconstrained power mode 200 (e.g., memory controller 15 may process memory access requests at a maximum speed).

Figure 8:
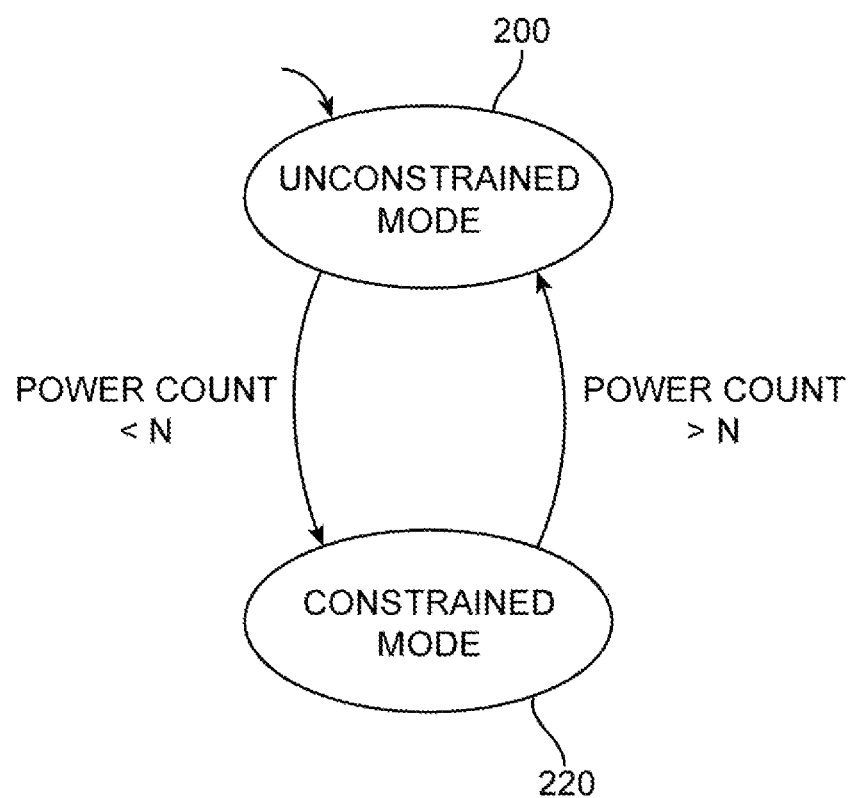
FIG. 8 is an exemplary diagram illustrating two memory controller operating modes in accordance with an embodiment of the present invention.

The state diagram of FIG. 8 illustrates the mode transitions of a memory controller 15 with two modes of operation. Upon startup (e.g., when the capacitance associated with memory controller 15 has been charged to a positive power supply voltage), memory controller 15 may be configured in unconstrained mode 200. During unconstrained mode 200, if the value of the power counter (power count) falls below a counter threshold N, memory controller 15 may be configured in constrained mode 220.

During constrained mode 220, if the power count increases above counter threshold N, memory controller 15 may be configured in unconstrained mode 200.

Figure 9:
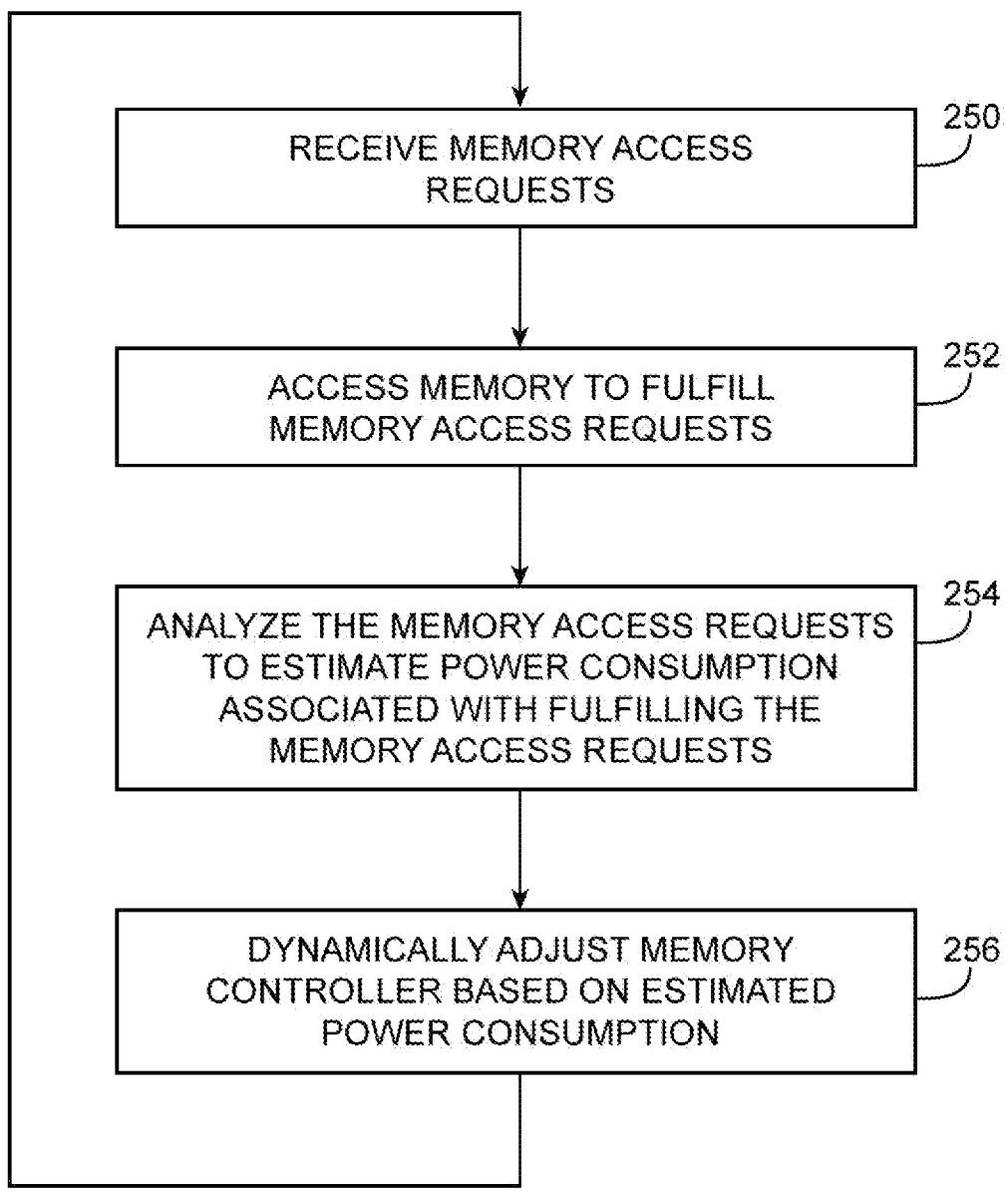
FIG. 9 is an exemplary flow chart of illustrative steps involved in dynamically operating a memory controller in accordance with an embodiment of the present invention.

The flow chart of FIG. 9 illustrates steps involved in operating memory controller 15 to dynamically respond to received memory access requests.

At step 250, memory controller 15 may receive memory access requests from various sources such as processing circuitry 18, DMA controller 16, or other sources of memory access requests (e.g., memory controller 15 may use controller circuitry 42 to receive memory access requests from various sources). Memory access requests may include read requests to a particular address, write requests to a particular address, or other requests involving system memory 11. The memory access requests may be received in an order (i.e., a sequence) from the various sources. For example, memory controller 15 may receive a first read request for a first address and then a second read request for a second address.

At step 252, memory controller 15 may access system memory 11 to fulfill the received memory access requests. For example, memory controller 15 may use memory interface circuitry to fulfill the first read request by configuring system memory 11 to respond with data stored at the first address in system memory 11. The order in which memory controller 15 fulfills the memory access requests may be optimized for latency, performance, power consumption, or other optimization metrics.

At step 254, power monitoring module 22 may analyze the memory access requests to estimate the power consumption associated with fulfilling the memory access requests. For example, power monitoring module 22 may estimate the power consumed by memory controller 15 and system memory 11 by analyzing the order of the memory access requests.

At step 256, power monitoring module 22 may dynamically adjust memory controller 15 based on the estimated power consumption. For example, in response to the estimated power consumption exceeding a threshold, power monitoring module 22 may adjust an operating mode for memory controller 15 to reduce power consumption (e.g., power monitoring module 22 may configure memory interface circuitry 44 to throttle memory access requests and power monitoring module 22 may configure controller circuitry 42 to reorder memory access requests to reduce power consumption). In response to the estimated power consumption falling below a threshold, power monitoring module 22 may adjust an operating mode for memory controller 15 to allow increased power consumption (e.g., power monitoring module 22 may configure controller circuitry 42 to optimize memory access requests for increased performance).

Figure 10:
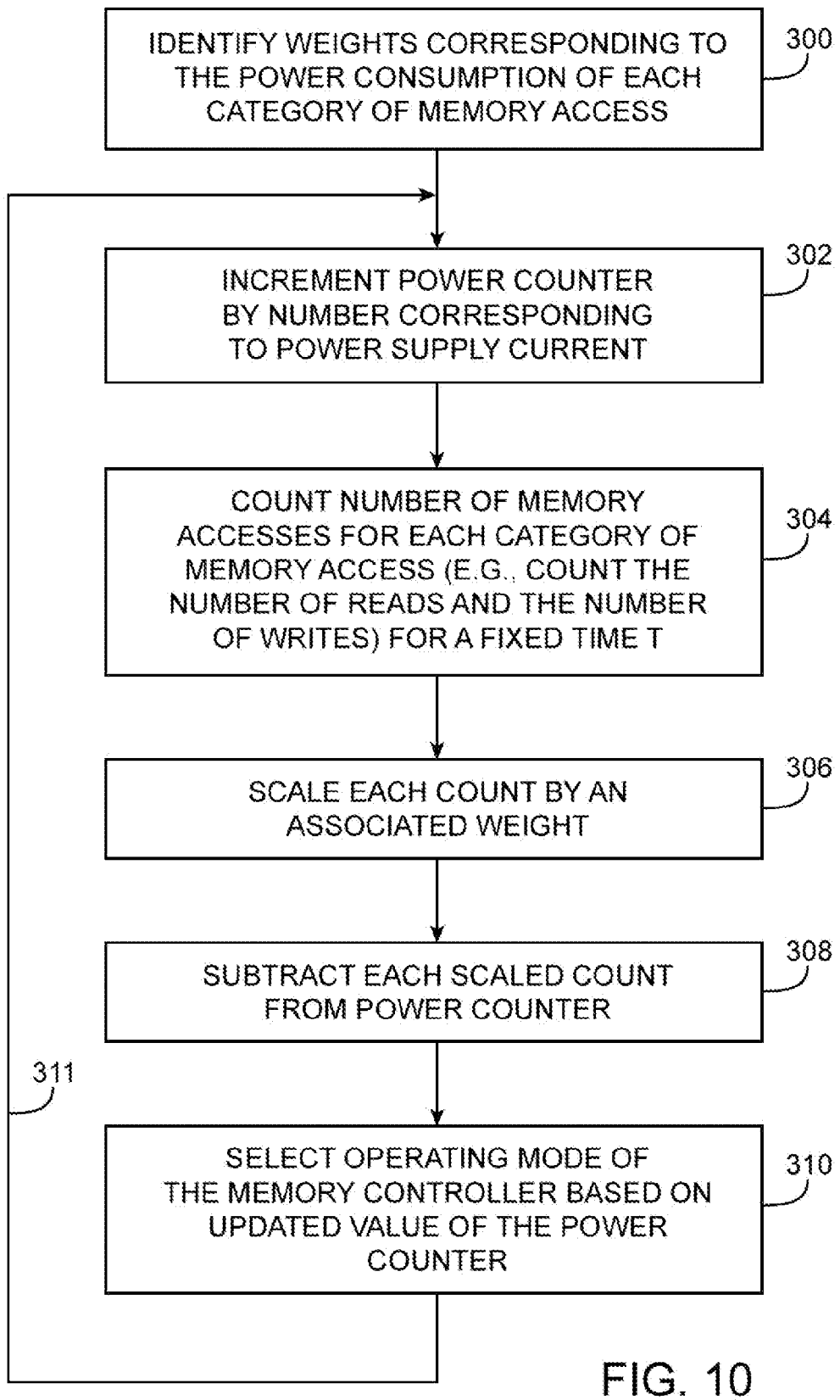
FIG. 10 is an exemplary flow chart of illustrative steps involved in monitoring the power consumption of a memory controller in accordance with an embodiment of the present invention.

The flow chart of FIG. 10 illustrates steps involved in operating memory controller 15 in different power saving modes.

At step 300, memory controller 15 may select weights corresponding to the power consumption of each memory access category. The weights may be predetermined (e.g., empirically measured or modeled) or dynamically measured and calibrated (e.g., based on measurements gathered using power monitoring module 22).

At step 302, memory controller 15 may increment the power counter by a number corresponding to the current supplied by power supply 102.

At step 304, memory controller 15 may count the number of memory accesses for each category of memory access. Categories may include reading an address, opening a page and reading an address, closing a page and reading an address, writing an address, opening a page and writing an address, etc. (as an example).

At step 306, memory controller 15 may scale the counts for each category of memory access by the weights identified in step 300.

At step 308, memory controller 15 may subtract the scaled counts from the power counter to obtain an updated count.

At step 310, memory controller 15 may select an operating mode (e.g., constrained power mode, priority power mode, or unconstrained power mode) based on the updated value of the power counter. For example, memory controller 15 may select the constrained power mode if the updated value of the power counter is below a counter threshold N1 (see, e.g., FIGS. 5 and 6). Processing may loop back to step 302 to continuously monitor the interactions between memory controller 15 and the system memory, as indicated by path 311.

The foregoing is merely illustrative of the principles of this invention and various modifications can be made by those skilled in the art without departing from the scope and spirit of the invention.

What is claimed is:

1. A method for using a memory controller that is coupled to processing circuitry and memory, the method comprising:
   receiving memory access requests from the processing circuitry using control circuitry in the memory controller, wherein the control circuitry comprises monitoring circuitry;
   accessing the memory by using memory interface circuitry in the memory controller to fulfill the memory access requests;
   monitoring a power consumption level associated with powering the memory controller and memory;
   generating a power metric with the monitoring circuitry based on the power consumption level;

dynamically adjusting the memory interface circuitry based on the power consumption level, wherein dynamically adjusting the memory interface circuitry comprises:

in response to determining that the power metric is greater than a first threshold, operating the memory interface circuitry in a first mode that is optimized for performance;

in response to determining that the power metric is less than the first threshold and greater than a second threshold that is less than the first threshold, operating the memory interface circuitry in a second mode that configures the memory interface circuitry to reorder at least a portion of the memory access requests when fulfilling the memory access requests; and in response to determining that the power metric is less than the second threshold, operating the memory interface circuitry in a third mode that configures the memory controller and the memory to consume less power than the first mode.

2. The method defined in claim 1 further comprising:

adjusting the first threshold with the control circuitry to decrease the power consumption level associated with powering the memory controller and the memory.

3. The method defined in claim 1 further comprising:

adjusting the second threshold with the control circuitry; and adjusting the first threshold with the control circuitry.

\* \* \* \* \*